Aug. 18, 1953   W. R. WILLIAMSON ET AL   2,649,408
EVAPORATOR
Filed April 29, 1949   5 Sheets-Sheet 4

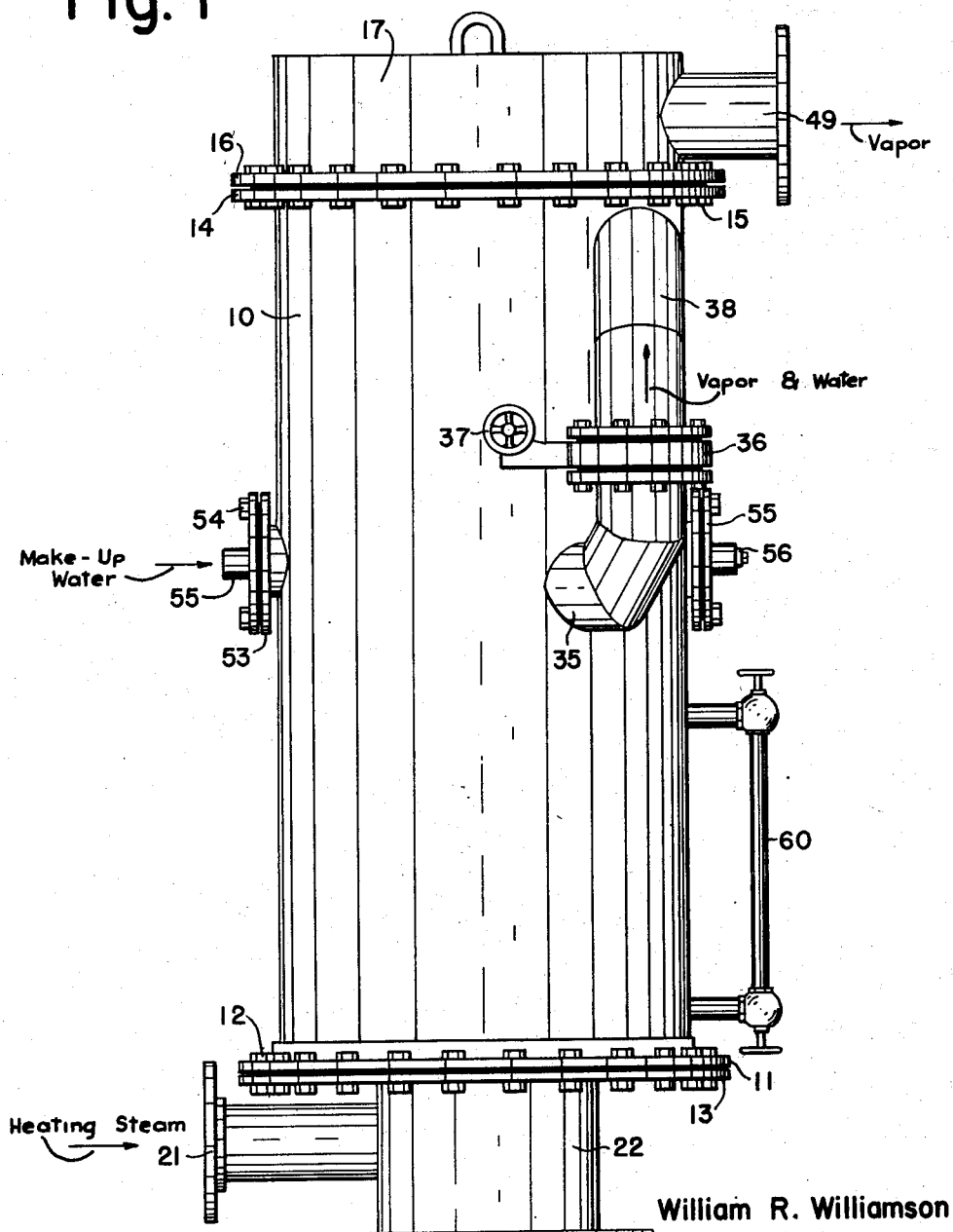

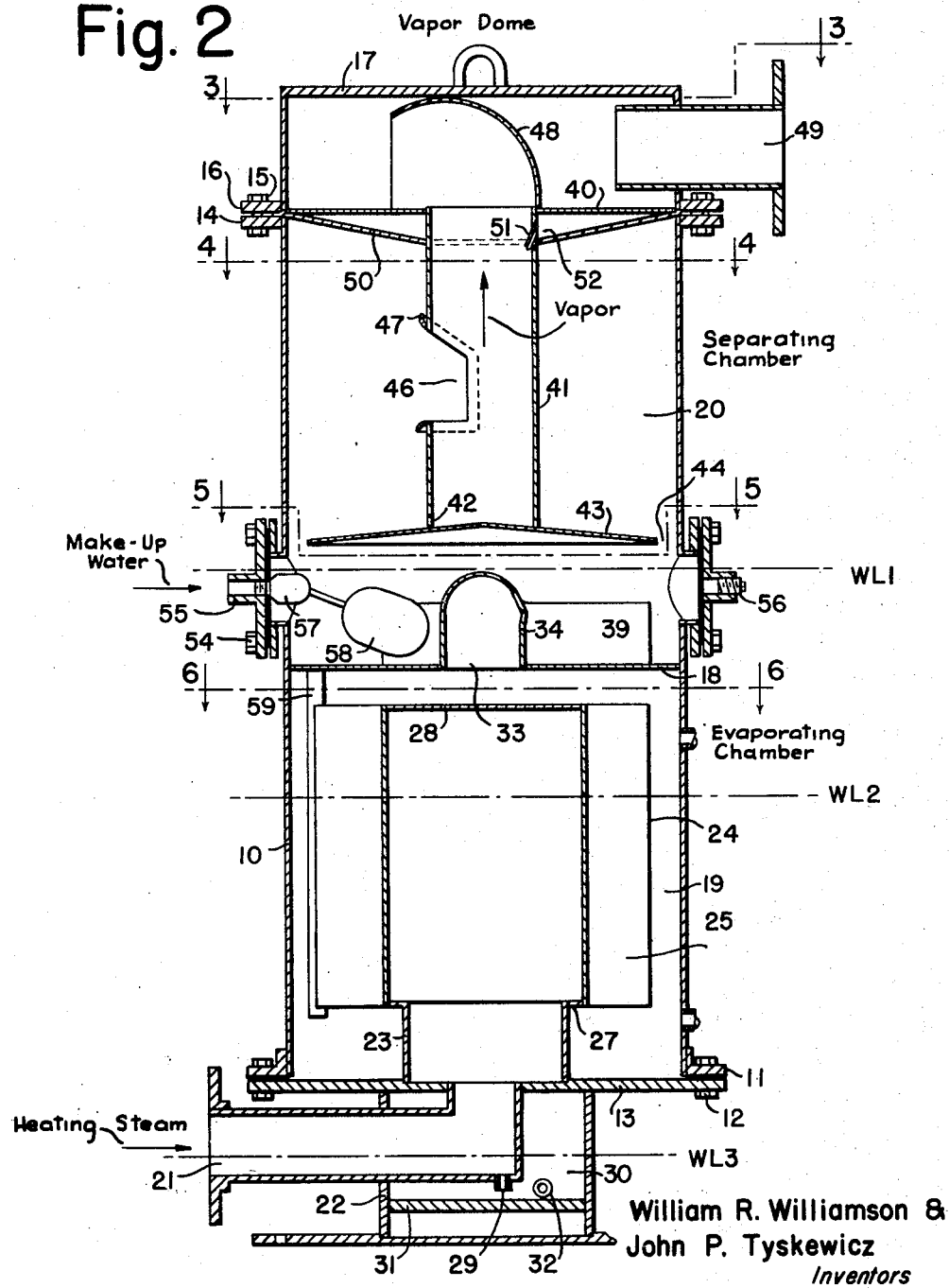

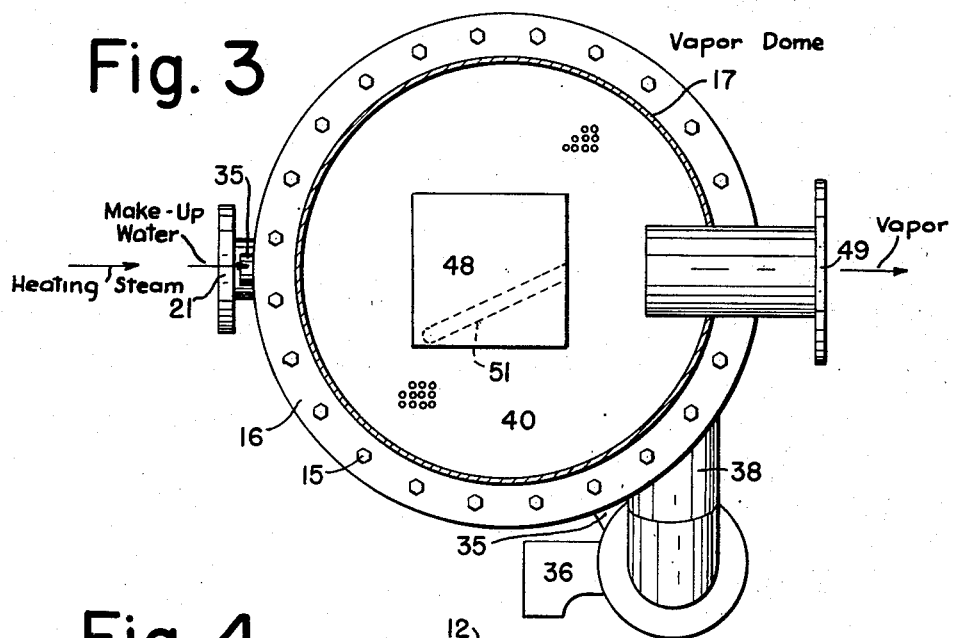
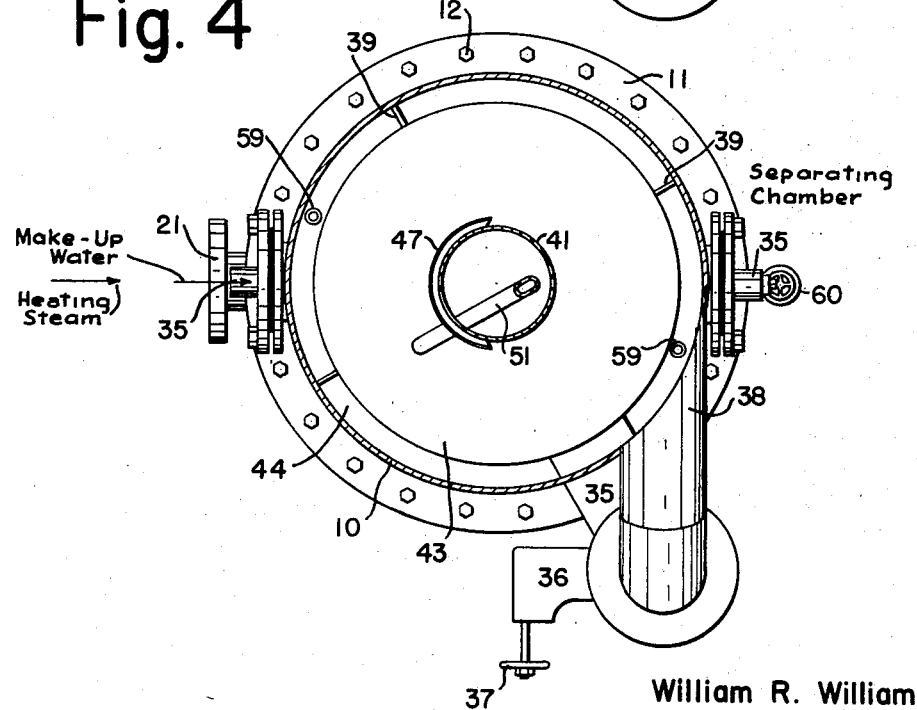

William R. Williamson &
John P. Tyskewicz
    *Inventors*
by Edward C. Taylor
    *Attorney*

Aug. 18, 1953   W. R. WILLIAMSON ET AL   2,649,408
EVAPORATOR

Filed April 29, 1949   5 Sheets-Sheet 5

William R. Williamson &
John P. Tyskewicz
*Inventors* by Edward C. Taylor
*Attorney*

Patented Aug. 18, 1953

2,649,408

UNITED STATES PATENT OFFICE 2,649,408

EVAPORATOR

William R. Williamson and John P. Tyskewicz, Hartford, Conn., assignors to The Maxim Silencer Company, Hartford, Conn., a corporation of Connecticut Application April 29, 1949, Serial No. 90,528

12 Claims. (Cl. 202—197)

1

This invention relates to evaporators, and in particular to evaporators for vaporizing sea water for producing drinking water by subsequent condensation.

An evaporator of this type is shown in the patent to Williamson 2,392,893, January 15, 1946, and it is one object of the invention to improve upon the performance of the device shown in that patent in various particulars. Especially is it an object to reduce the formation of adherent scale in the interior of the evaporator and to improve upon the separation of entrained water from the vapor to reduce the carry-over of salt.

We have discovered that the formation of badly adherent scale in the evaporation of sea water can largely be prevented if the water is thoroughly heated, with its surface not under pressure, before it is allowed to boil. Any carbon dioxide is thus allowed to pass off, preventing the formation of magnesium carbonate, which is harder to remove from the walls of the evaporator than the magnesium hydroxide which forms the bulk of the scale formed from sea water. The present evaporator is therefore designed to transmit the maximum amount of heat from the boiler to the water which lies at the bottom of the combined separating and feedwater chamber.

The invention will now be described with reference to the accompanying drawings, in which Fig. 1 is an elevation of an evaporator constructed in accordance with the invention;

Fig. 2 is a median vertical section thereof;

Fig. 3 is a section on line 3—3 of Fig. 2;

Fig. 4 is a section on line 4—4 of Fig. 2;

Figure 5:
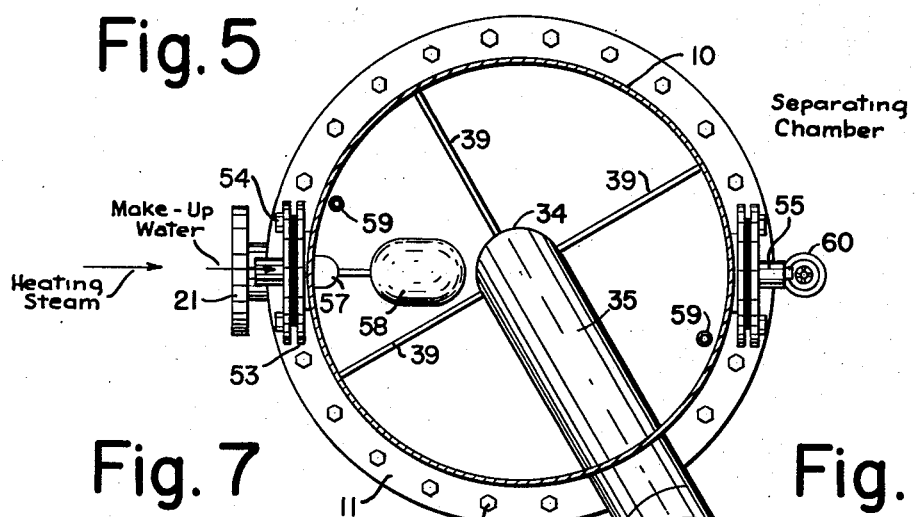
Fig. 5 is a section on line 5—5 of Fig. 2.
Figure 7:
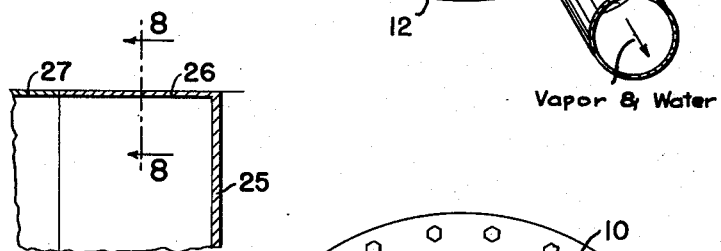
Fig. 7 is an enlarged section on line 7—7 of Fig. 6.

The evaporator is enclosed in a cylindrical shell 10 secured by a flange 11 and bolts 12 to a base section 13. A flange 14 and bolts 15 secure the top of the shell 10 to a flange 16 on the lower edge of a short cylindrical vapor dome 17 with a closed top. An intermediate partition 18 (Fig. 2) divides the shell into a boiler chamber 19 and a separator chamber 20 intermediate the boiler and the vapor dome. A steam inlet pipe 21 enters the central cylindrical section 22 of the base and leads the steam upwardly into the boiler section through a neck 23. The latter is surmounted by a "basket" 24 which is closed everywhere except where it is coupled to the steam entering through the neck 23. For clarity the heating steam is referred to as "steam" while that arising from the heated sea water is called "vapor."

Figure 8:
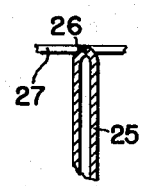
Fig. 8 is a section on line 8—8 of Fig. 7.
Figure 6:
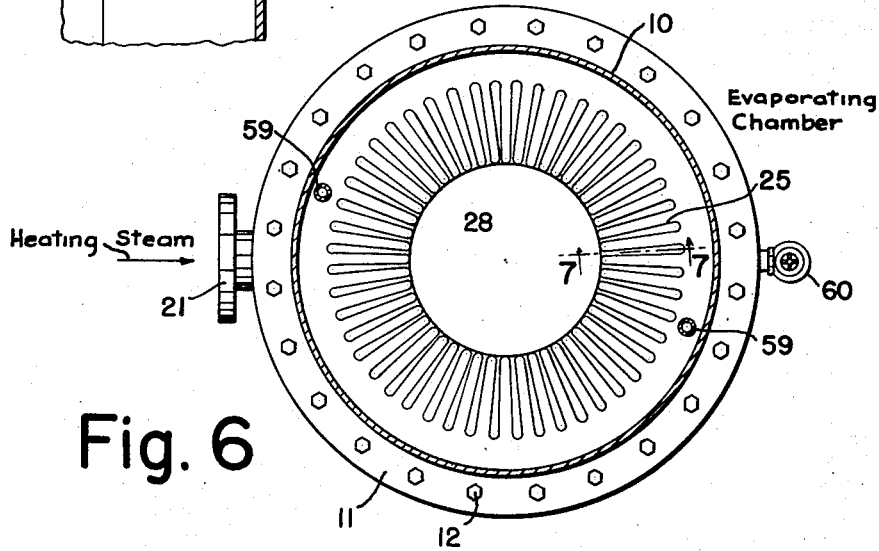
Fig. 6 is a section on line 6—6 of Fig. 2.
Figure 9:
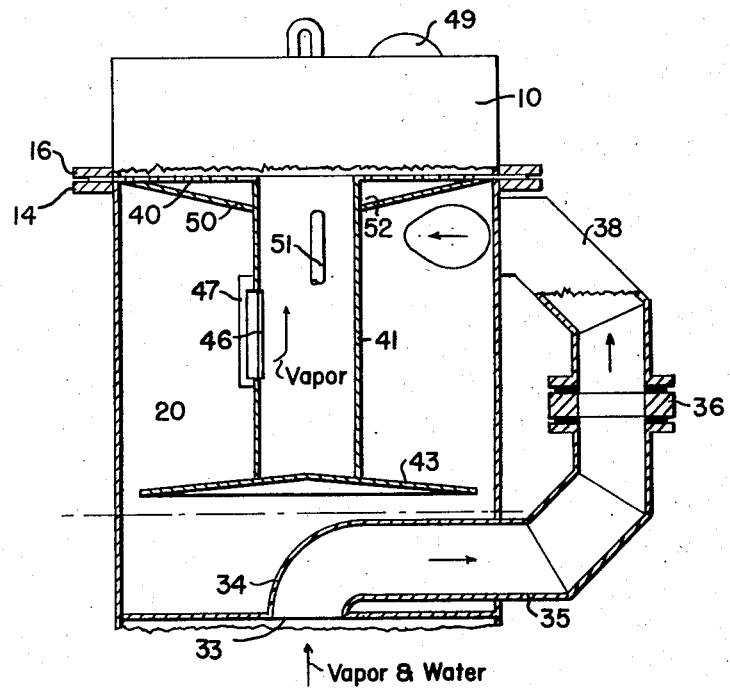
Fig. 9 is a partial median vertical section taken at an angle of approximately 45° to that of Fig. 2 to show the course of the vapor and entrained water traveling through the conduit system from the evaporating chamber to the upper part of the separating chamber.

The basket 24 is formed of a deeply corrugated sheet 25 (Fig. 6) bent into cylindrical form and sealed off at the top and bottom by bending inwardly as at 26 (Fig. 8) and welding the joint. The cylindrical corrugated sheet is sealed to neck 23 by an annulus 27 (Fig. 2) welded both to the corrugated sheet and to the neck, and is sealed off at the top by a disk 28 welded in place. Steam entering the basket is condensed and runs out a drain 29 leading into a chamber 30 formed by welding a disk 31 within the cylindrical section 22. Condensed water is removed from this chamber by a pipe 32. The deep corrugations of the basket afford an extremely high surface area for transfer of heat to water within the boiler section 19.

In a manner to be described water is maintained within the boiler chamber 19 at a level WL2 which is varied according to the conditions desired in the distillate, and which is automatically maintained at the level corresponding to those conditions. Partition 18 has a central aperture 33 (Fig. 2) leading into an elbow 34 (Figs. 2 and 5) which delivers vapor from the salt water in 19 through a pipe 35 passing horizontally through the water in the lower portion of the separating chamber 20 and out through the shell 10. Outside the shell the pipe 35 turns upwardly (Fig. 1) for connection with a valve casing 36 containing a butterfly valve controllable by a handle 37. The valve casing is connected to the upper part of the separator chamber 20 by a pipe 38 which enters the chamber tangentially (Fig. 4) so as to cause whirling of the steam in the chamber with a consequent separation of water drops. Radiating from the elbow 34 and welded to the partition 18 are a plurality of vanes 39 which have the double function of preventing whirling of the water in the lower part of the separator chamber and of acting as extended heating surfaces of the partition 18. The latter function, which is of great importance in the matter of scale prevention as will be described below, is also performed by that portion of the pipe 35 within shell 10.

A plate 40 of perforated metal extends across the shell 10 between it and the vapor dome 17, and is centrally apertured to receive a pipe 41 which extends vertically downward along the axis of the shell 10 to a point somewhat above the vanes 39. At this point the pipe is closed off, except for a small drain notch 42, by a conical plate 43 which extends nearly to the shell 10, leaving a peripheral gap 44. The conical plate prevents vapor bubbles from carrying water into the upper part of the separating chamber, while the gap 44 allows the vapor to pass freely. In one side of the vertical pipe 41 is an inlet vapor opening 46, surrounding which is an apron or flange 47 of sheet metal turned outwardly and away from the edge of the opening to prevent entrance of condensed water running down or creeping along the outside of the pipe. A vapor deflector or hood 48 is mounted at the top of the vertical pipe 41 above the plate 40, serving to direct the vapor away from the outlet conduit 49 and cause separation of entrained water drops by impingement on the sides of the vapor dome. Conduit 49 leads to any suitable condenser, from which drinking water may be obtained.

Condensed water dripping through the perforated plate 40 is caught by an inverted conical plate 50 and returned to the separator chamber by a pipe 51. This pipe opens into the gutter 52 formed between the cone 50 and the pipe 41 and runs downwardly through the wall of the latter and through the lower cone 43 as shown in Fig. 4. The slant given to the pipe 51 is for the purpose of directing it as much as possible at the outlet 49, so that a cleaning rod may be inserted through the latter, pushed through the perforated plate 40 and down the drain pipe 51 to remove scale.

Opposed flanges 53 on the sides of the shell are secured by bolts 54 to water inlet connectors 55 to provide for either right or left hand coupling to a water supply, the connector not in use being closed as by a plug 56. An inlet valve 57 operated by a float 58 acts as a constant level device in the customary manner to preserve the water level in the bottom of the separator chamber 20 at a minimum height WL1. By a pair of pipes 59 extending through partition 18 to the lower part of the boiler chamber 19, thus being under water at both ends, the water level in the latter is kept at a height controlled by the setting of the throttle valve handle 37. A gage glass 60 shows the height of the water in the usual way.

In operation steam is admitted to inlet 21 and condenses inside the basket 24 in the process of transferring its heat to the water in boiler 19. The water condensed in the basket runs out through drains 29, 32. Sea water to be evaporated enters through inlet 55 and fills the chamber 20 to a height WL1 under the control of the float valve 57. Water from chamber 20 passes into the boiler 19 through pipes 59 and with the boiler cold will fill it completely. With the water in the boiler heated to boiling, however, the vapor thus developed will impinge on the partition 18 and find its way through the aperture 33 to the vapor uptake pipe 35. In all this travel it transfers heat to water in chamber 20, and some of it condenses to water which returns to the boiler for reevaporation.

When the evaporator is boiling under steady conditions the vapor from the boiler passes through pipe 35, through the throttling valve 36, and through tangential pipe 38 which takes the vapor and entrained water into the upper part of the separating chamber 20. Here, due to its tangential introduction, it whirls around the periphery of the chamber, depositing its entrained water on the walls and building up a substantially non-rotating core which passes through opening 46 and up pipe 41. Water which forms on the outside of pipe 41 is kept from entering it by the apron 47 which surrounds the opening 46, while water which forms within the pipe drains out on the surface of cone 43 through the opening 42. Another chance is had by the vapor to drop water traveling with it in the vapor dome 17, where water will pass through the perforated plate 40 and run down the drain tube 51.

The manner of regulating the residual salinity of the distillate is substantially the same as in the original Williamson patent. Partially closing the valve 36 will increase the pressure difference between chambers 19 and 20, and water will be forced out of the boiler 19 up the pipes 59 into the separator chamber. The water level WL2 will thus be lowered, exposing more of the upper part of the basket 24 for contact with vapor. The vapor will thus be drier and, since the salinity of the distillate is due entirely to droplets of the salt water, less salty. Some salinity in the distillate is not only tolerable but desirable where the resulting condensate is to be used for drinking, and the desired balance can easily be reached.

Particular attention is directed to the great heat transfer from the boiler chamber 19 to the water in separator chamber 20. Some heat is transferred directly through partition 18, the lower side of which is in contact with the hot vapor in the boiler. More of this heat is carried from the partition into the water above it by fins 39, and still further heat is imparted to the water in chamber 20 by that portion of the vapor conducting pipe 34, 35 which lies within shell 10. The pressure within chamber 20 is not far from atmospheric, so that carbon dioxide dissolved in the water entering through inlet 55 is driven off before it has a chance to form adhering scale under the higher temperatures in the boiler.

What we claim is:

1. An evaporator comprising a cylindrical shell, transverse partitions across the interior of the shell dividing it into a lower boiler chamber, a middle separator chamber and an upper vapor dome, a heat exchanger in the boiler chamber, a constant level device for admitting water into the separator chamber, a vapor outlet from the vapor dome, a connection between the lower portions of the boiler and separator chambers, a vapor passage from the separator chamber into the vapor dome, and a throttled vapor conduit leading from the top of the boiler through the separator chamber below the water level therein, passing externally of the shell, and re-entering the shell tangentially at the upper portion of the separator chamber.

2. An evaporator comprising a cylindrical shell, transverse partitions across the interior of the shell dividing it into a lower boiler chamber, a middle separator chamber, and an upper vapor dome, a constant level device for admitting water into the separator chamber, a vapor outlet from the vapor dome, a connection between the lower portions of the boiler and separator chambers, a pipe extending downwardly from the vapor dome into the separator chamber along the axis of the shell, substantially closed at its bottom and having a side opening into the separator chamber, and a throttled vapor conduit leading from the top of the boiler through the separator chamber below the water level therein, passing externally of the shell, and re-entering the shell tangentially at the upper portion of the separator chamber, whereby steam will be caused to whirl in the separator chamber externally of the pipe and will be conducted away from the chamber by the pipe substantially free from whirling.

3. An evaporator as claimed in claim 2 in which the pipe has an outwardly turned apron surrounding said side opening to prevent water drops from entering the pipe.

4. An evaporator comprising a cylindrical shell, transverse partitions across the interior of the shell dividing it into a lower boiler chamber, a middle separator chamber, and an upper vapor dome, a constant level device for admitting water into the separator chamber, a vapor outlet from the vapor dome, a connection between the lower portions of the boiler and separator chambers, a pipe extending downwardly from the vapor dome into the separator chamber, a conical plate closing the bottom of the pipe and extending nearly to the wall of the shell to prevent splashing of water, the pipe having a drain hole above the conical plate and a side opening into the separator chamber, and a throttled vapor conduit leading from the top of the boiler through the separator chamber below the water level therein, passing externally of the shell, and re-entering the shell tangentially at the upper portion of the separator chamber, whereby steam will be caused to whirl in the separator chamber externally of the pipe and will be conducted away from the chamber by the pipe substantially free from whirling.

5. An evaporator as claimed in claim 4 in which the pipe has an outwardly turned apron surrounding said side opening to prevent water drops from entering the pipe.

6. An evaporator comprising a cylindrical shell, transverse partitions across the interior of the shell dividing it into a lower boiler chamber, a middle separator chamber, and an upper vapor dome, a deeply corrugated cylinder mounted within the boiler chamber, steam and condensate connections to the lower end of the corrugated cylinder, said cylinder being otherwise closed, a constant level device for admitting water into the separator chamber, a vapor outlet from the vapor dome, a connection between the lower portions of the boiler and separator chambers, a pipe extending downwardly from the vapor dome into the separator chamber along the axis of the shell, substantially closed at its bottom and having a side opening into the separator chamber, and a throttled vapor conduit leading from the top of the boiler through the separator chamber below the water level therein, passing externally of the shell, and re-entering the shell tangentially at the upper portion of the separator chamber, whereby steam will be caused to whirl in the separator chamber externally of the pipe and will be conducted away from the chamber by the pipe substantially free from whirling.

7. An evaporator comprising a cylindrical shell, transverse partitions across the interior of the shell dividing it into a lower boiler chamber, a middle separator chamber, and an upper vapor dome, a deeply corrugated cylinder mounted within the boiler chamber, steam and condensate connections to the lower end of the corrugated cylinder, said cylinder being otherwise closed, a constant level device for admitting water into the separator chamber, a vapor outlet from the vapor dome, a connection between the lower portions of the boiler and separator chambers, a pipe extending downwardly from the vapor dome into the separator chamber, a conical plate closing the bottom of the pipe and extending nearly to the wall of the shell to prevent splashing of water, the pipe having a drain hole above the conical plate and a side opening into the separator chamber, and a throttled vapor conduit leading from the top of the boiler through the separator chamber below the water level therein, passing externally of the shell, and re-entering the shell tangentially at the upper portion of the separator chamber, whereby steam will be caused to whirl in the separator chamber externally of the pipe and will be conducted away from the chamber by the pipe substantially free from whirling.

8. An evaporator comprising a cylindrical shell, transverse partitions across the interior of the shell dividing it into a lower boiler chamber, a middle separator chamber, and an upper vapor dome, a constant level device for admitting water into the separator chamber, a vapor outlet from the vapor dome, a connection between the lower portions of the boiler and separator chambers, the partition between the vapor dome and the separator chamber being formed of a perforated metal plate and an inverted cone below it, a pipe extending downwardly through said plates, secured to them, and passing along the axis of the shell into the separator chamber, said pipe being substantially closed at its bottom and having a side opening into the separator chamber, a drain pipe between the interior of the inverted cone and an underwater portion of the separator chamber, and a throttled vapor conduit leading from the top of the boiler through the separator chamber below the water level therein, passing externally of the shell, and re-entering the shell tangentially at the upper portion of the separator chamber.

9. An evaporator as claimed in claim 8 in which the pipe has an outwardly turned apron surrounding said side opening.

10. An evaporator comprising a cylindrical shell, transverse partitions across the interior of the shell dividing it into a lower boiler chamber, a middle separator chamber, and an upper vapor dome, a constant level device for admitting water into the separator chamber, a vapor outlet from the vapor dome, a connection between the lower portions of the boiler and separator chambers, the partition between the vapor dome and the separator chamber being formed of a perforated metal plate and an inverted cone below it, a pipe extending downwardly through said plates, secured to them, and passing along the axis of the shell into the separator chamber, a conical plate closing the bottom of the pipe and extending nearly to the wall of the shell to prevent splashing of water, the pipe having a drain hole above the conical plate and a side opening into the separator chamber, a drain pipe between the interior of the inverted cone and an underwater portion of the separator chamber, and a throttled vapor conduit leading from the top of the boiler through the separator chamber below the water level therein, passing externally of the shell, and re-entering the shell tangentially at the upper portion of the separator chamber.

11. An evaporator as claimed in claim 10 in which the pipe has an outwardly turned apron surrounding said pipe opening.

12. An evaporator comprising a vaporizing chamber having a heat exchanger for supplying heat to water therein, a separator chamber, a conduit from the vaporizing chamber entering the upper portion of the separator chamber tangentially to impart a whirling motion to the vapor to remove entrained water therefrom, and means for conducting water from the bottom of the separator to an underwater part of the vaporizing chamber, said conduit passing from the vaporizing chamber directly through the separating chamber below the water level therein to maintain the water in the separating chamber hot enough to drive off dissolved gases.

WILLIAM R. WILLIAMSON.
JOHN P. TYSKEWICZ.

References Cited in the file of this patent

UNITED STATES PATENTS

| Number | Name | Date |
|---|---|---|
| 558,984 | Potter | Apr. 28, 1896 |
| 624,575 | Sweet | May 9, 1899 |
| 1,617,082 | Price | Feb. 8, 1927 |
| 1,781,057 | Elmwall | Nov. 11, 1930 |
| 2,063,425 | Fletcher | Dec. 8, 1936 |
| 2,392,893 | Williamson | Jan. 15, 1946 |
| 2,446,880 | Kleinschmidt | Aug. 10, 1948 |